(12) United States Patent
Smith et al.

(10) Patent No.: US 8,702,125 B1
(45) Date of Patent: Apr. 22, 2014

(54) MULTI-STRAINER EMISSION TREATMENT FOR INFLATABLE RESTRAINT SYSTEM INFLATORS

(71) Applicants: Bradley W. Smith, Ogden, UT (US); David W. Parkinson, North Ogden, UT (US)

(72) Inventors: Bradley W. Smith, Ogden, UT (US); David W. Parkinson, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/744,667

(22) Filed: Jan. 18, 2013

(51) Int. Cl.
*B60R 21/16* (2006.01)

(52) U.S. Cl.
USPC .......................... 280/740; 280/741; 280/742

(58) Field of Classification Search
USPC .......................................... 280/740, 741, 742
See application file for complete search history.

(56) References Cited

U.S. PATENT DOCUMENTS

| | | | |
|---|---|---|---|
| 4,005,876 A * | 2/1977 | Jorgensen et al. ............ | 280/741 |
| 5,378,015 A | 1/1995 | Rink et al. | |
| 5,845,933 A * | 12/1998 | Walker et al. ................. | 280/741 |
| 6,299,200 B1 * | 10/2001 | Bowers et al. ............. | 280/730.2 |
| 7,178,830 B2 * | 2/2007 | Blackburn .................... | 280/736 |
| 7,192,055 B2 * | 3/2007 | Stevens et al. ................ | 280/741 |
| 7,568,728 B2 * | 8/2009 | Smith et al. ................... | 280/736 |
| 7,654,565 B2 * | 2/2010 | McCormick et al. ......... | 280/736 |
| 7,712,778 B2 | 5/2010 | Smith et al. | |
| 7,770,924 B2 * | 8/2010 | Cox et al. ...................... | 280/741 |
| 7,806,954 B2 * | 10/2010 | Quioc ......................... | 55/385.3 |
| 7,887,091 B1 * | 2/2011 | Cox et al. ...................... | 280/741 |
| 8,011,302 B2 * | 9/2011 | Abaziou ...................... | 102/530 |
| 8,191,927 B2 * | 6/2012 | Jordan et al. .................. | 280/741 |

* cited by examiner

*Primary Examiner* — Toan To
(74) *Attorney, Agent, or Firm* — Pauley Petersen & Erickson

(57) ABSTRACT

An exemplary embodiment can be an inflator module assembly. The inflator module assembly can include a module housing having a plurality of gas discharge openings; an inflator housed within the housing, the inflator, upon actuation, emitting gas from one lateral side or end thereof, and a gas treatment assembly mounted within the housing external the side or end of the inflator from which gas is emitted. The gas treatment assembly can include a first strainer element nestled within a second strainer element. The first and second strainer elements each have a side wall including a plurality of gas passage apertures, with at least either 1) the gas passage apertures of the first strainer element offset relative to the gas passage apertures of the second strainer element or 2) the gas passage apertures of the second strainer element offset relative to the module housing gas discharge openings.

20 Claims, 7 Drawing Sheets

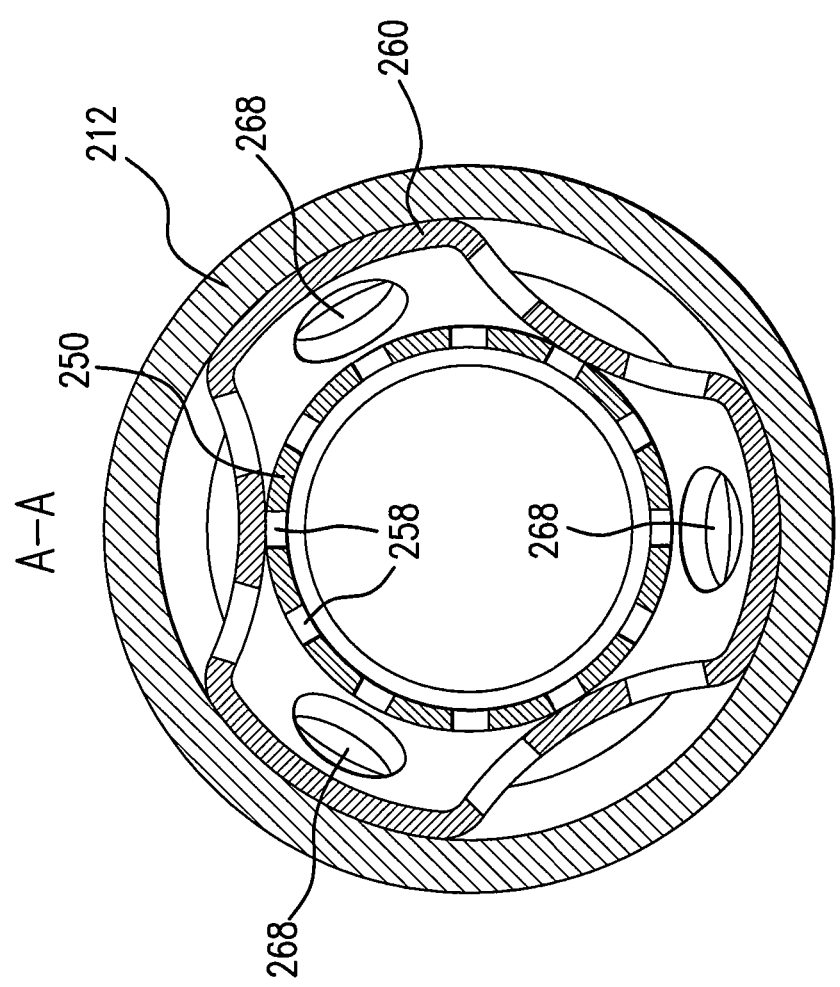

MULTI-STRAINER EMISSION TREATMENT FOR INFLATABLE RESTRAINT SYSTEM INFLATORS

BACKGROUND OF THE INVENTION

This invention relates generally to inflatable restraint systems and, more particularly, to improved treatment of the emission of an inflator of such inflatable restraint systems.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included the steering wheel, the dashboard on the passenger side of a vehicle, along the roof line of a vehicle such as above a vehicle door, and the vehicle seat such as in the case of a seat-mounted airbag cushion. Other airbag cushions such as in the form of knee bolsters and overhead airbags also operate to protect other or particular various parts of the body from collision.

In addition to an airbag cushion, inflatable passive restraint system installations also typically include a gas generator, also commonly referred to as an "inflator." Upon actuation, such inflator devices desirably serve to provide an inflation fluid, typically in the form of a gas, used to inflate an associated airbag cushion.

Various types or forms of inflator assemblies or devices have been disclosed in the art for use in inflating an airbag cushion such as used in inflatable restraint systems. One type of known inflator device derives inflation gas from a combustible solid pyrotechnic gas generating material which, upon ignition, generates a quantity of gas sufficient to inflate the airbag.

In such and similar inflator devices, the reaction or burning of solid gas generant and/or initiation materials almost invariably results in the production or formation of a gaseous product having an elevated temperature as well as commonly containing elevated levels of particulate materials such as resulting from or remaining after reaction by or of the gas generant and/or initiation materials.

Current state of the art automotive airbag technology typically employs wire filter technology for cooling and filtering the exit gases generated by the reaction or combustion of the gas generating pyrotechnic material contained in such inflator devices. Knitted wire filters are typically cheaper than wire mesh or woven type filters and are widely used in the industry. Such use of knitted wire filters has generally proven as successful at capturing and collecting similar amounts of the solid combustion byproducts entrained in the exit gases produced by the gas generating pyrotechnic and/or initiation materials as other filtration technologies. However, as inflator sizes have been reduced in an effort to satisfy and meet more stringent or sever auto industry weight and size requirements, this type of filtration technology has generally become much less effective at cooling and filtering the exit gases of inflators. More particularly, as the gas paths within inflator system hardware have shortened in length and with less or reduced turning of the gases, such filtration technology has become much less effective at cooling and filtering the exit gases of the inflators.

The results and consequences of such lessened or reduced gas treatment can be significant. For example, gases exiting an inflator device that have higher particulate content and/or higher temperature can necessitate redesign of the system in an effort to avoid and minimize undesired complications such as due to increased module cushion fabric burn through and erosion of the sewn seams due to contact or exposure to such higher particulate content and/or higher temperature exit gases. One possible means to compensate for increased module cushion fabric burn through and erosion of the sewn seams is to redesign the module bags with fabric doublers and seam protection. Such redesigns, however, typically add to the cost, size and/or weight of the module. In addition, wire filters employing smaller wires have been tested but due to the high temperatures of the exiting gases and particulates, such wire filters are prone to be more easily damaged and eroded causing similar problems with module cushion fabric burn through and/or erosion of the sewn seams.

Thus, there is an ongoing challenge to improve the treatment of the gas emission of such inflator devices, particularly in view of weight and size reductions being imposed with modern inflator and passive restraint system design.

SUMMARY OF THE INVENTION

The present invention provides improved emission treatment for inflatable restraint system inflators.

In accordance with one aspect of the invention, there is provided an inflator module assembly that includes a module housing having a plurality of gas discharge openings. The module assembly also includes an inflator housed within the housing, the inflator, upon actuation, emitting gas from one lateral side or end thereof. The module assembly further includes a gas treatment assembly mounted within the housing external the side or end of the inflator from which gas is emitted. The gas treatment assembly includes a first strainer element nestled within a second strainer element. The first and second strainer elements each have a side wall that includes a plurality of gas passage apertures, with at least either 1) the gas passage apertures of the first strainer element offset relative to the gas passage apertures of the second strainer element and/or 2) the gas passage apertures of the second strainer element offset relative to the module housing gas discharge openings.

In accordance with one preferred embodiment, both the gas passage apertures of the first strainer element are offset relative to the gas passage apertures of the second strainer element and the gas passage apertures of the second strainer element are offset relative to the module housing gas discharge openings.

In accordance with another aspect of the invention, there is provided an inflator module assembly that includes a module housing, an inflator housed within the housing and a gas treatment assembly mounted within the housing. The module housing includes at least two rows of gas discharge openings. The inflator, upon actuation, provides or emits gas from one lateral side or end thereof. The gas treatment assembly is mounted within the housing external the side or end of the inflator from which gas is emitted. The gas treatment assembly includes a first strainer cup element nestled within a second strainer cup element. The first and second strainer cup elements each have a side wall that includes a plurality of rows of gas passage apertures. The gas passage apertures of the first strainer element are offset relative to the gas passage apertures of the second strainer element such that gas that passes through the gas passage apertures of the first strainer element must turn at approximately 90 degrees at least twice to subsequently also pass through one of the gas passage apertures in the second strainer element. The gas passage apertures of the second strainer element are offset relative to the module housing gas discharge openings gas such that gas passing through the gas passage apertures of the second strainer element must turn at approximately 90 degrees at least twice to subsequently also pass through one of the module housing gas discharge openings.

Other objects and advantages will be apparent to those skilled in the art from the following detailed description taken in conjunction with the appended claims and drawings.

BRIEF DESCRIPTION OF THE DRAWINGS

This invention is explained in greater detail below in view of exemplary embodiments shown in the drawings, wherein:

FIGS. 4A and 4B are sectional views of the end portion of the inflator module assembly shown in FIG. 4 and taken along the lines A-A and B-B, respectively.

DETAILED DESCRIPTION OF THE INVENTION

Figure 1:
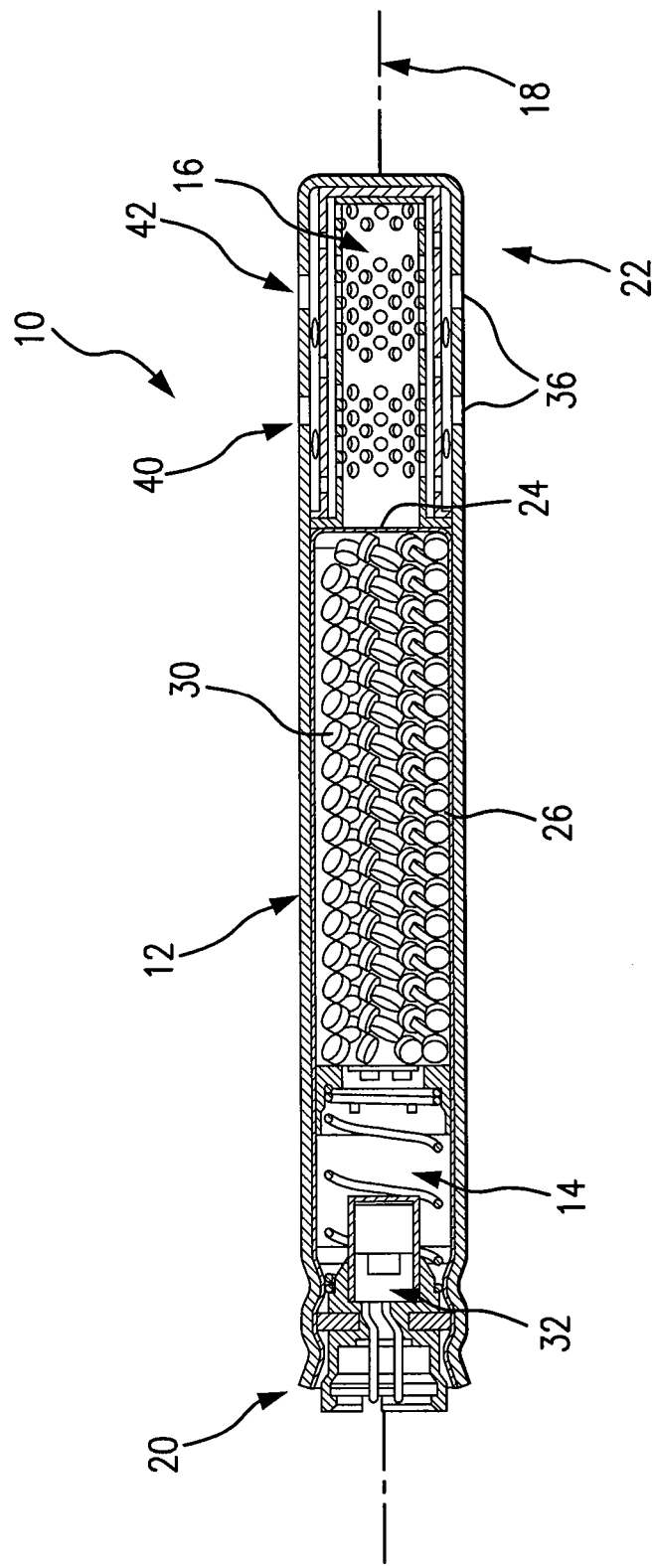
FIG. 1 is a simplified, partially in section, plan view of an inflator module assembly in accordance with one embodiment of the invention.

As described in greater detail below, the present invention provides improved emission treatment for inflatable restraint system inflators.

The presently preferred embodiments of the present invention will be best understood by reference to the drawings, wherein like parts are designated by like numerals throughout. It is to be understood that the components of the present invention, as generally described and illustrated in the drawings herein, can be arranged and designed in a wide variety of different configurations. Thus, the following more detailed description of embodiments of the present invention, as represented in the drawings, is not intended to limit the scope of the invention, as claimed, but is merely representative of presently preferred embodiments of the invention.

Figure 2:
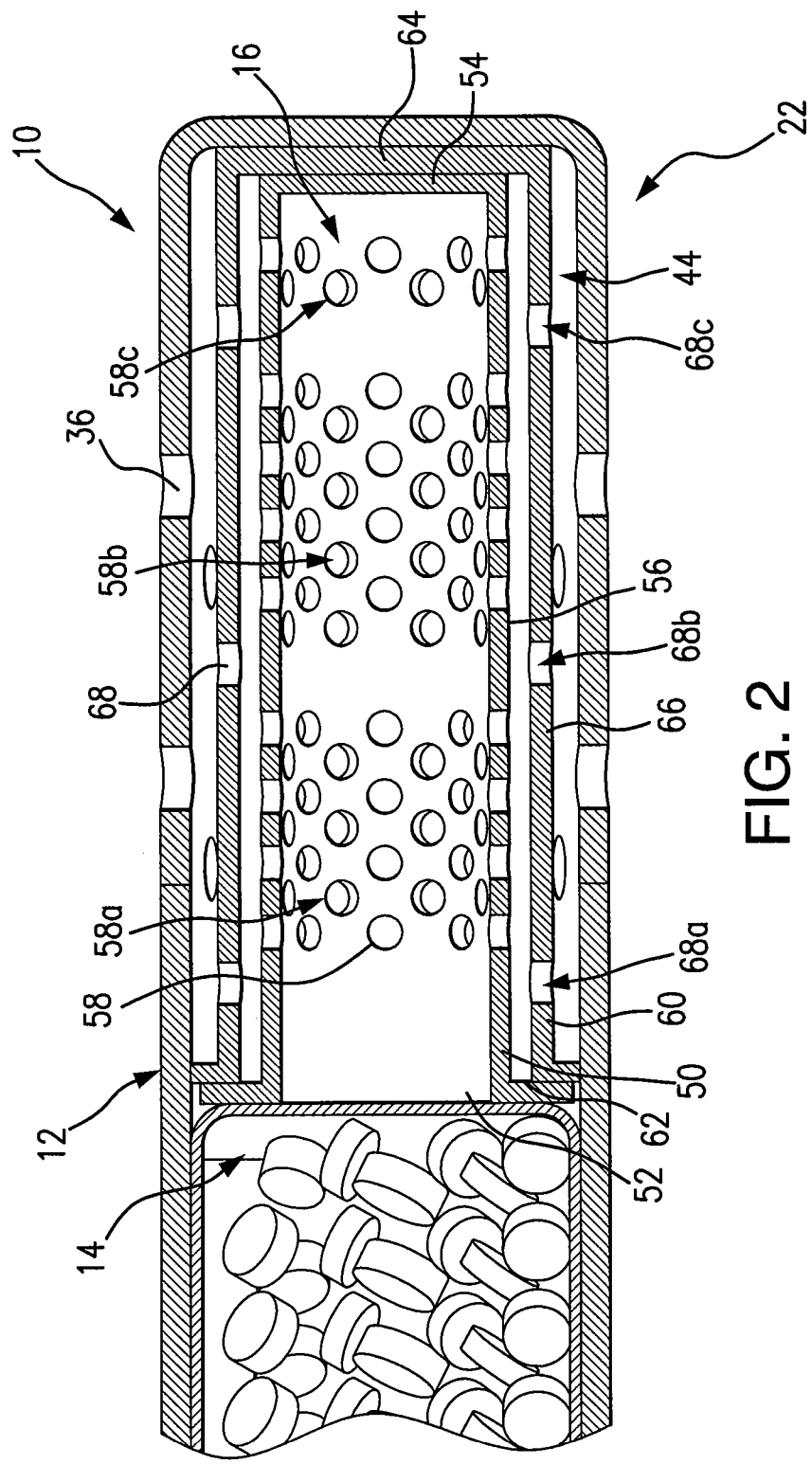
FIG. 2 is an enlarged, simplified, partially in section, plan view of the end portion of the inflator module assembly shown in FIG. 1.
Figure 3:
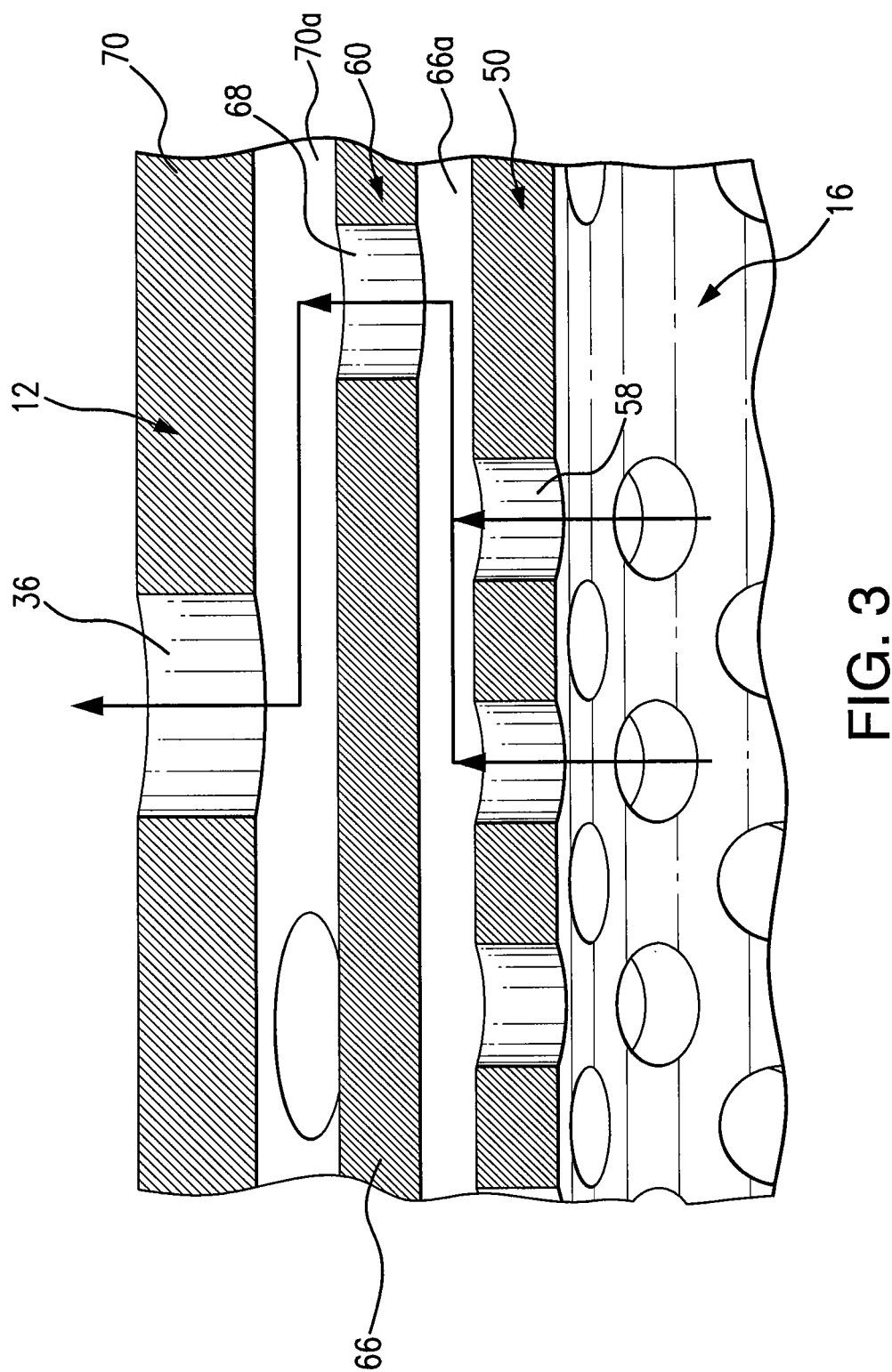
FIG. 3 is a further enlarged, fragmentary portion of inflator module assembly shown in FIGS. 1 and 2.
Figure 4:
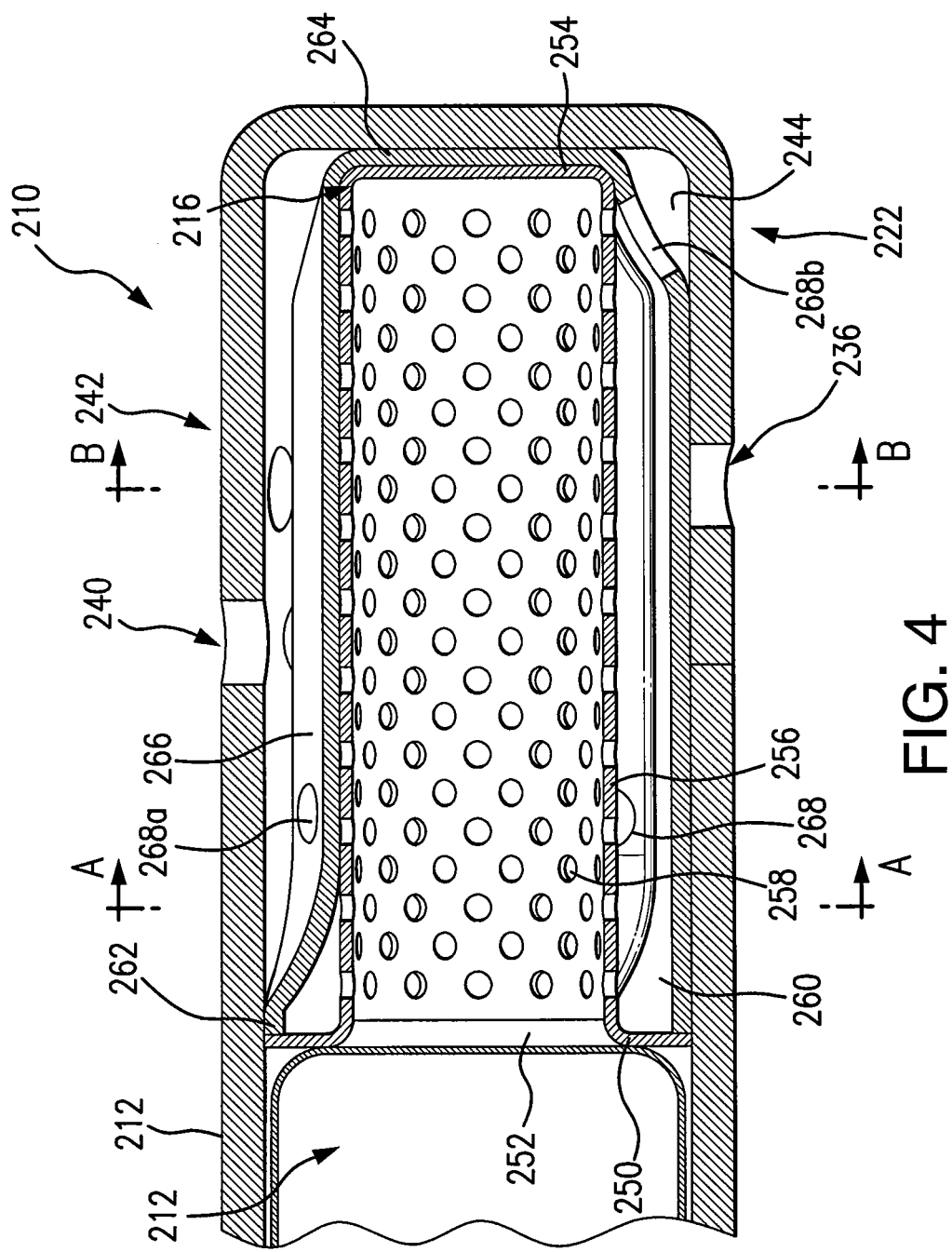
FIG. 4 is an enlarged, simplified, partially in section, plan view of an end portion of an inflator module assembly in accordance with another embodiment of the invention.
Figure 4B:
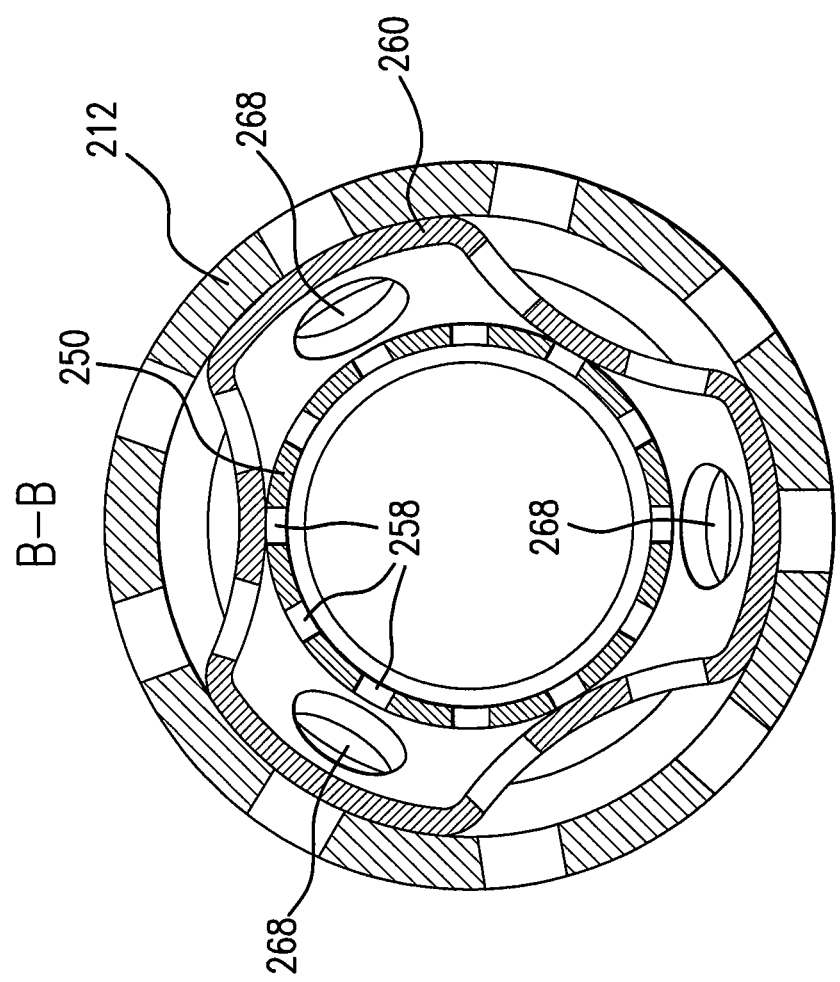
Figure 5:
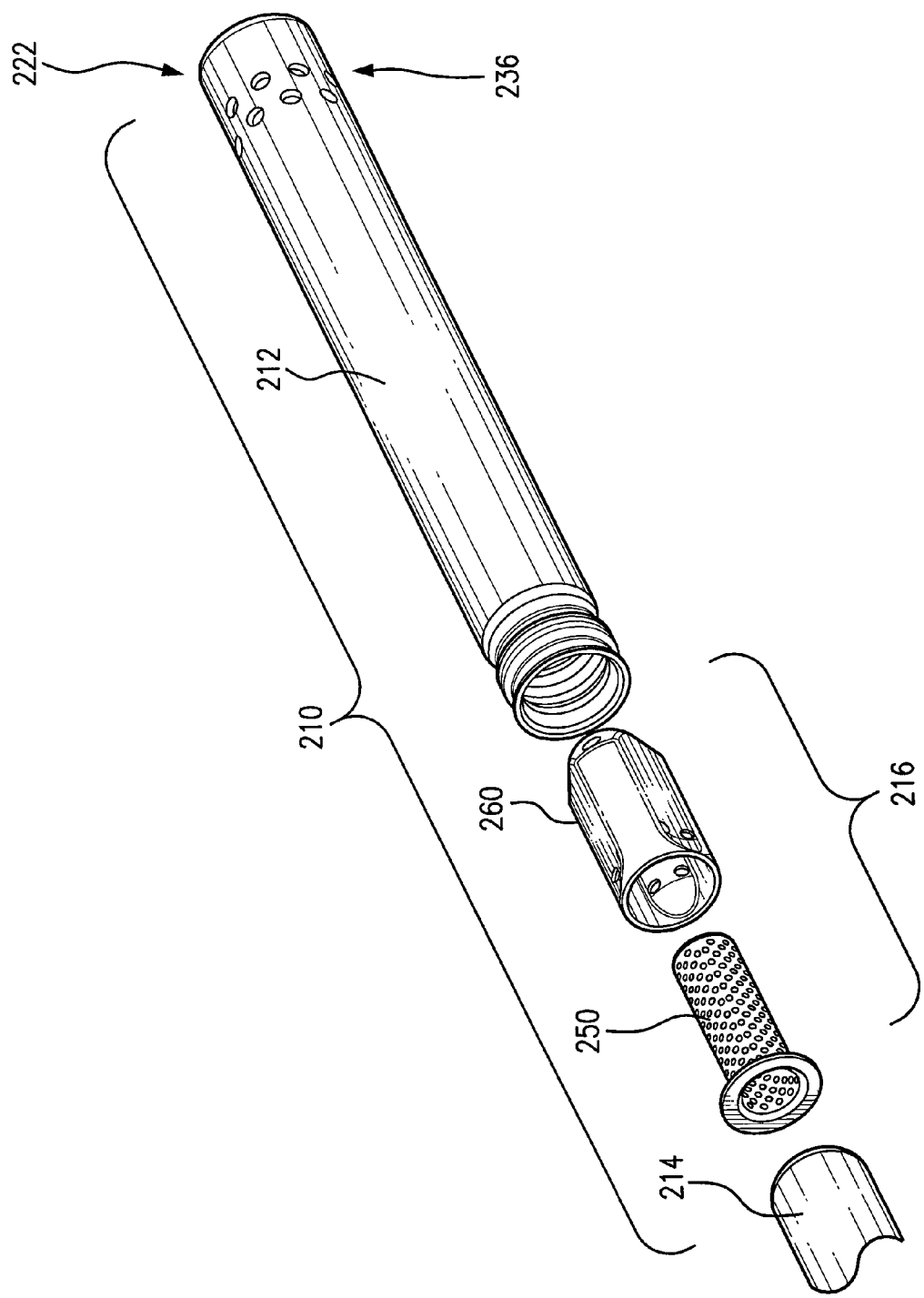
FIG. 5 is an exploded view of the end portion of the inflator module assembly shown in FIG. 4.

FIGS. 1-3 illustrate an inflator module assembly in accordance with one embodiment of the invention and generally designated by the reference numeral 10. The inflator module assembly 10 includes a module housing 12, with an inflator 14 and a gas treatment assembly 16 appropriately housed, disposed or contained within the module housing 12.

The module housing 12 and the inflator 14 may be generally cylindrical in shape and have a longitudinal axis 18 that extends along the length of the module housing 12 and the inflator 14. In the embodiment of FIG. 1, the longitudinal axis 18 is generally positioned along the center of the cylindrical-shaped module housing 12 and the inflator 14.

The module housing 12 and the inflator 14 are each generally made of metal (or other suitable material), such as are known in the art. The module housing 12 has a first end portion 20 that is open and an opposed second end portion 22 that is closed. The inflator 14 and the gas treatment assembly 16 are generally housed, disposed or otherwise appropriately contained within the module housing 12 such as in a generally longitudinally extending alignment or arrangement.

The inflator 14, upon actuation, can act or serve to emit gas from one lateral side or end thereof, such end generally designated by the reference numeral 24. In practice, the end 24 is typically scored such as in a pattern of an X or a cross, for example, such as to provide a repeatable opening when gas initiation occurs therewithin.

The inflator 14 is a longitudinally shaped bottle-type inflator configured to define a generally cylindrical chamber, here designated by reference numeral 26. The modes of operation of such inflator devices are well known in the art and thus the inflator 14 will be further herein described only in reference to those features or aspects involved in the practice of the subject invention.

The chamber 26 contains or houses a quantity or supply of gas generant material 30, such as composed of a gas generating solid. As is known in the art, a gas generant is a pyrotechnic or other similar material that is capable of producing a supply of gas when the material is appropriately reacted or combusted. A variety of different types of gas generant materials are known in the art. In general, any type of material that is capable of producing a quantity of gas upon combustion may be used as the gas generant material 30. Further, gas generant material solids can take various shapes or forms including, tablets, granules, wafers and grain forms, for example. In general, any one or more shape or form of gas generant material solid may be used in the practice of the invention as the gas generant material 30. Thus, those skilled in the art and guided by the teachings herein provided will appreciate that the broader practice of the invention is not necessarily limited to specific or particular shapes or forms of gas generant material used therein.

The inflator 14 further includes an initiator 32. The initiator 32 is a device such as of the type known in the art and is capable of igniting or otherwise appropriately initiate gas producing reaction of the gas generant material 30 upon receipt of the appropriate signal. In the embodiment shown in FIG. 1, the initiator 32 is generally disposed at or adjacent the module housing first end 20. The module housing 12 includes a plurality of gas discharge openings 36 at or adjacent the module housing second end 22. The gas discharge openings 36 are generally arranged or disposed about the module housing 12 in an array of two sets 40 and 42 of two generally parallel rows. The broader practice of the invention is not, however, limited to the gas discharge openings being disposed in such a particular or specific placement about the module housing. Those skilled in the art and guided by the teachings herein provided will appreciate that various specific arrangements of gas discharge openings can be utilized in the practice of the invention, with the choice or selection of a specific or particular arrangement of gas discharge openings being based on a factor such as the desired specific performance criteria for a particular application of the invention, for example.

As perhaps best seen by reference to FIG. 2, the gas treatment assembly 16 is generally disposed within the module housing 12 such as in a chamber portion 44 within the module housing 12 adjacent or at the end portion 22. The gas treatment assembly 16 generally comprises a first or inner strainer element 50 nestled within a second or outer strainer element 60. The strainer elements 50 and 60 are each desirably made of metal, such as steel, (or other suitable material) such as to operationally tolerate and withstand particulate-containing gas emissions from the associated inflator device 14.

The first strainer element 50 includes an open first end 52, a closed second end 54 and a sidewall 56 extending therebetween, with the sidewall 56 including a plurality of gas passage apertures 58, such as disposed to form an array of multiple, e.g., at least two, rows of holes in the sidewall 56. Similarly, the second strainer element 60 similarly includes an open first end 62, a closed second end 64 and a sidewall 66 extending therebetween, with the sidewall 66 including a plurality of gas passage apertures 68, such as disposed to form an array of multiple, e.g., at least two, rows of holes in the sidewall 66. As the strainer elements 50 and 60 each include a closed end, such strainer elements are sometimes herein referred to as being "cup-shaped."

The spacing between the strainer elements 50 and 60 is preferably wide enough such that exit gas flow is not restricted or otherwise not undesirably impeded. Those skilled in the art and guided by the teachings herein provided will appreciate the gas flow restriction preferably occurs at the gas passage apertures 68 of the outer strainer element 60 or at the gas discharge openings 36 in the module housing wall 12.

As shown in FIG. 2, the gas passage apertures 58 of the first strainer element 50 are offset relative to the gas passage apertures 68 of the second strainer element 60. Further, the gas passage apertures 68 of the second strainer element 60 are offset relative to the module housing gas discharge openings 36.

As shown in FIG. 2, the plurality of gas passage apertures 58 of the inner strainer element 50 are generally disposed or arranged in two or more groups of apertures. More specifically, in FIG. 2, the plurality of gas passage apertures 58 of the inner strainer element 50 are generally disposed or arranged in three groups 58a, 58b, and 58c, with each group including at least two rows of apertures.

The gas passage apertures 58 of the inner strainer element 50 can desirably be generally sized to retain the particular burning gas generant material solid(s) until the burning gas generant material solid(s) have burned and reduced in size such as to be passable through the gas passage apertures 58 with the hot gases and burnt particles that are being produced. The gas passage apertures 68 of the outer strainer element 60 can desirably be generally sized to control the combustion pressure inside the inflator device. The gas discharge openings 36 of the module housing 12 can desirably be generally sized so as to appropriately reduce the velocity of the gases exiting from the inflator. By controlling the combustion pressure at or on the outer strainer element instead of at the housing or chamber wall and sizing the housing or chamber openings such as to reduce the velocity of the gases as they exit the inflator, significant reductions in aggressiveness to the associated module cushion can be realized. With such reduction in aggressiveness, the need for the inclusion of cushion design features such as fabric doublers, liners and the like can desirably be generally reduced, if not eliminated, and thus significant cost savings can be realized in corresponding inflator/module systems.

Turning to FIG. 3, the gases (including associated burning and/or burnt particles) exit through the gas passage apertures 58 in the inner strainer element 50 at a relatively high velocity such as to result in impingement and adherence or plating of the particles (e.g., those particles with a high enough mass to be expelled from the gas stream) upon contacting the inner surface 66a of the outer strainer element sidewall 66. Additionally, heat is transferred from the gases and associated particulates to the inner and outer strainers 50 and 60 as those gases and associated particulates are in intimate contact along the flow path through the gas treatment assembly 16. Further, the velocity of the gases and particulates is desirably significantly slowed via the flow path required by the gases and particulates through the gas treatment assembly 16, e.g., via the exit from the first strainer element 50 and impingement upon the strainer wall 66.

As shown in FIG. 2, the plurality of gas passage apertures 68 of the outer strainer element 60 are generally disposed or arranged in two or more groups of apertures. More specifically, in FIG. 2, the plurality of gas passage apertures 68 of the inner strainer element 60 are generally disposed or arranged in three spaced apart groups of apertures, 68a, 68b, and 68c. The gas passage apertures 68 are offset from the gas passage apertures 58 of the inner strainer element 50.

Those skilled in the art and guided by the teachings herein provided will understand and appreciate that these gas passage apertures 68 can and desirably are sized to appropriately control the internal pressure of the inflator module assembly 10.

Returning to FIG. 3, the gases after having impinged upon the inner surface 66a of the outer strainer element 60 and desirably after having plated out some of the particulates on the wall 66 of the strainer element 60 and having reduced velocity, have to turn at an approximate 90 degree angle as they move along the strainer wall to exit the gas passage apertures 68 in the outer strainer element 60. The gases again turn at an approximate 90 degree angle as they exit through the gas passage apertures 68 in the outer strainer element 60 causing impingement and adherence or plating of the particles (those with a high enough mass to be expelled from the gas stream) upon the inner surface 70a of the wall 70 of the module housing 12.

Heat is desirably further transferred from the gases and associated particulates to the wall 70 and the outer strainer element 60 as those gases and associated particulates are in intimate contact along the flow path through the gas treatment assembly 16 and module housing 12. Additionally, the velocity of the gases and particulates is desirably further slowed via the flow path required by the gases and particulates through the gas treatment assembly 16, e.g., via the exit from the second strainer element 60 and impingement upon the wall 70.

As shown in FIG. 2, the module housing 12 has several rows of the gas discharge openings 36. The gas discharge openings 36 are desirably sized to further reduce the velocity of the exiting gases. These rows of gas discharge openings 36 are offset from the gas passage apertures 68 of the outer strainer element 60. The gases after having impinged upon the inner surface of the module housing wall, and having plated out some of the particulates on the module housing wall, and having reduced velocity, have to turn at an approximate 90 degree angle as they move along the wall of the strainer element 60 and the wall of the module housing 12 to exit the gas discharge openings 36 in the module housing 12. The gases again turn at an approximate 90 degree angle as they exit through the gas discharge openings 36 in the module housing 12 and impinge upon the associated fabric cushion (not shown).

Turning now to FIGS. 4, 4A, 4B and 5, there is illustrated an inflator module assembly in accordance with one embodiment of the invention and generally designated by the reference numeral 210. The inflator module assembly 210 is in various respects similar to the inflator module assembly 10, described above. For example, the inflator module assembly 210, similar to the inflator module assembly 10, includes a module housing 212, with an inflator 214 and a gas treatment assembly 216 appropriately housed, disposed or contained within the module housing 212 such as in a generally longitudinally extending alignment or arrangement. The module housing 212 includes a plurality of gas discharge openings 236 at or adjacent the module housing second end 222. The gas discharge openings 236 are generally arranged or disposed about the module housing 12 in an array of two parallel rows 240 and 242.

The gas treatment assembly 216 is generally disposed within the module housing 212 such as in a chamber portion 244 within the module housing 212 adjacent or at the end portion 222. Similar to the above-described embodiment, the gas treatment assembly 216 generally comprises a first or inner strainer element 250 nestled within a second or outer strainer element 260. The strainer elements 250 and 260 again can each desirably be made of metal (or other suitable material) such as to operationally tolerate and withstand particulate-containing gas emissions from the associated inflator device.

The first strainer element 250 includes an open first end 252, a closed second end 254 and a sidewall 256 extending therebetween, with the sidewall 256 including a plurality of gas passage apertures 258. In this particular embodiment, the gas passage apertures 258 are generally uniformly spaced about the sidewall 256.

Similarly, the second strainer element 260 similarly includes an open first end 262, a closed second end 264 and a sidewall 266 extending therebetween, with the sidewall 266 including a plurality of gas passage apertures 268, such as disposed to form at least two rows of holes in the sidewall 266.

In this embodiment, some of the gas passage apertures 258 of the first strainer element 250 may not be offset relative to the gas passage apertures 268 of the second strainer element 260, however, the vast majority of the gas passage apertures 258 of the first strainer element 250 are offset relative to the gas passage apertures 268 of the second strainer element 260. Further, the gas passage apertures 268 of the second strainer element 260 are offset relative to the module housing gas discharge openings 236. Thus, this embodiment can also permit realization of at least some of the benefits of a tortuous gas flow path through a gas treatment assembly and out of a module assembly, in accordance with the invention. As will be appreciated by those skilled in the art and guided by the teachings herein provided, such embodiment may find best utilization in conjunction with gas generant materials that do not produce significant quantities or proportions of burning and/or burnt particle that need to be capture, separated or otherwise removed from the gases produced by or in the inflator.

The plurality of gas passage apertures 268 of the outer strainer element 260 are generally disposed or arranged in two or more groups of apertures. More specifically, the plurality of gas passage apertures 268 of the inner strainer element 260 are generally disposed or arranged in two spaced apart groups of apertures, 268a and 268b.

As in the above-described embodiment, the gases (including associated burning and/or burnt particles) exit through the gas passage apertures 258 in the inner strainer element 250 at a relatively high velocity such as to result in impingement and adherence or plating of the particles (e.g., those particles with a high enough mass to be expelled from the gas stream) upon contacting the inner surface 266a of the outer strainer element sidewall 266. Additionally, heat is transferred from the gases and associated particulates to the inner and outer strainers 250 and 260 as those gases and associated particulates are in intimate contact along the flow path through the gas treatment assembly 216. Further, the velocity of the gases and particulates is desirably significantly slowed via the flow path required by the gases and particulates through the gas treatment assembly 216, e.g., via the exit from the first strainer element 250 and impingement upon the strainer wall 266.

The module housing 212 has several rows of the gas discharge openings 236. As shown, these rows of gas discharge openings 236 are offset from the gas passage apertures 268 of the outer strainer element 260. The gases after having impinged upon the inner surface of the module housing wall, and having plated out some of the particulates on the module housing wall, and having reduced velocity, have to turn at an approximate 90 degree angle as they move along the wall of the strainer element 260 and the wall of the module housing 212 to exit the gas discharge openings 236 in the module housing 212. The gases again turn at an approximate 90 degree angle as they exit through the gas discharge openings 236 in the module housing 212 and impinge upon the associated fabric cushion (not shown).

Multi-strainer emission treatment for inflatable restraint system inflators, as herein described, allows for elimination of the current filters. More specifically, the inclusion and use of a multi-strainer emission treatment, as herein described, in place of the current filter devices overcomes at least some of the problems described above associate with the use of inflators of reduced size, while maintaining the small size, weight and cost advantages of current state of the art inflators as required in the competitive marketplace.

For the purpose of simplification and to facilitate illustration and understanding, the invention has been described above making reference to an embodiment utilizing two strainer elements. Those skilled in the art and guided by the teachings herein provided will understand and appreciate that if desired the invention can be practiced with 3 or more strainer elements such as appropriately nested within one another such as herein described.

Significant features of at least selected embodiments of inflator module assemblies as herein provided include:

1. Design of strainer elements such that the different velocities of the gases and particulates at various points in the strainer elements and module housing, particularly at impingement points and turning points, cause various sizes of particles to adhere or plate out onto the surfaces of the strainer elements and module housing. This has the effect of reducing the amount of particulate that exits the module housing into the module cushion thus reducing damage to the cushion fabric.

2. Design of the strainer elements such that the flow path is longer than through a traditional inflator filter. This additional time allows for more effective heat transfer from the gases and particulate to the strainer element and the module housing walls. Again this helps reduce damage to the cushion fabric and the sewn seams of the cushion.

3. The strainer elements are structural by design and by restricting the gas flow can reduce the pressure at the module housing wall thus reducing the structural load on the module housing wall at the gas discharge openings. The reduced structural load on the module housing allows for the addition of more gas discharge openings and thus a reduction in the heat flux coming from any one gas discharge opening. This heat flux reduction is evident in cushion fabric testing and serves to reduce the amount or extent of fabric burning and erosion at the impingement points on the module cushion fabric.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator module assembly comprising:
a module housing having a plurality of gas discharge openings;
an inflator housed within said housing, said inflator comprising an initiator and, upon actuation, emitting gas from one lateral side or end thereof, and
a gas treatment assembly mounted within said housing external the side or end of the inflator from which gas is emitted, said gas treatment assembly comprising a first strainer element nestled within a second strainer element, the first and second strainer elements each having a side wall including a plurality of gas passage apertures, with at least either 1) the gas passage apertures of the first strainer element offset relative to the gas passage apertures of the second strainer element or 2) the gas passage apertures of the second strainer element offset relative to the module housing gas discharge openings, wherein gas emitted from the inflator passes through the gas treatment assembly prior to emission from the inflator.

2. The inflator module assembly of claim 1 wherein the gas passage apertures of the first strainer element are offset relative to the gas passage apertures of the second strainer element and the gas passage apertures of the second strainer element are offset relative to the module housing gas discharge openings and wherein gas produced within the inflator passes through the first strainer element and subsequently the second strainer element.

3. The inflator module assembly of claim 1 wherein the plurality of gas passage apertures of at least one of said first and second strainer elements are disposed in an array of at least two rows of holes about the side wall of the respective strainer element.

4. The inflator module assembly of claim 3 wherein the plurality of gas passage apertures of each of said first and second strainer elements are respectively disposed in an array of at least two rows of holes about the side wall of said respective strainer element.

5. The inflator module assembly of claim 1 wherein at least one of the first and second strainer elements is cup-shaped.

6. The inflator module assembly of claim 5 wherein both the first and second strainer elements are cup-shaped.

7. The inflator assembly of claim 1 wherein the gas passage apertures of the first strainer element are arranged in at least two groups, with each group including at least two rows of apertures.

8. The inflator assembly of claim 7 wherein the gas passage apertures of the first strainer element are arranged in at least three groups, with each group including at least two rows of apertures.

9. The inflator assembly of claim 1 wherein the gas passage apertures of the first strainer element are uniformly spaced about the side wall thereof.

10. The inflator assembly of claim 1 wherein the plurality of gas discharge openings are disposed about the module housing in at least two rows.

11. The inflator assembly of claim 1 wherein the inflator contains a quantity of gas generant solid effective upon reaction to produce gas and wherein the gas emitted from the inflator additionally comprises particulate matter resulting from the reacted gas generant solid.

12. The inflator assembly of claim 1 wherein the first and the second strainer elements are sufficiently spaced one from the other such that the spacing does not restrict exit gas flow.

13. The inflator assembly of claim 1 wherein the gas passage apertures of the second strainer element are sized to control combustion pressure within the inflator.

14. An inflator module assembly comprising:
a module housing having a plurality of gas discharge openings;
an inflator housed within said housing, said inflator, upon actuation, emitting gas from one lateral side or end thereof; and
a gas treatment assembly mounted within said housing external the side or end of the inflator from which gas is emitted, said gas treatment assembly comprising a first strainer element nestled within a second strainer element, the first and second strainer elements each having a side wall including a plurality of gas passage apertures, with at least either 1) the gas passage apertures of the first strainer element offset relative to the gas passage apertures of the second strainer element or 2) the gas passage apertures of the second strainer element offset relative to the module housing gas discharge openings, wherein gas passing through at least one of the gas passage apertures of the first strainer element must turn at approximately 90 degrees at least twice to subsequently also pass through one of the gas passage apertures in the second strainer element.

15. The inflator assembly of claim 14 wherein gas passing through at least one of the gas passage apertures of the second strainer element must turn at approximately 90 degrees at least twice to subsequently also pass through one of the module housing gas discharge openings.

16. An inflator module assembly comprising:
a module housing having a plurality of gas discharge openings;
an inflator housed within said housing, said inflator, upon actuation, emitting gas from one lateral side or end thereof; and
a gas treatment assembly mounted within said housing external the side or end of the inflator from which gas is emitted, said gas treatment assembly comprising a first strainer element nestled within a second strainer element, the first and second strainer elements each having a side wall including a plurality of gas passage apertures, with at least either 1) the gas passage apertures of the first strainer element offset relative to the gas passage apertures of the second strainer element or 2) the gas passage apertures of the second strainer element offset relative to the module housing gas discharge openings, wherein gas passing through at least one of the gas passage apertures of the second strainer element must turn at approximately 90 degrees at least twice to subsequently also pass through one of the module housing gas discharge openings.

17. An inflator module assembly comprising:
a module housing including at least two rows of gas discharge openings;

an inflator housed within said housing, said inflator, upon actuation, emitting gas from one lateral side or end thereof, and a gas treatment assembly mounted within said housing external the side or end of the inflator from which gas is emitted, said gas treatment assembly comprising a first strainer cup element nestled within a second strainer cup element, the first and second strainer cup elements each having a side wall including a plurality of rows of gas passage apertures, with the gas passage apertures of the first strainer element offset relative to the gas passage apertures of the second strainer element and wherein gas passing through the gas passage apertures of the first strainer element must turn at approximately 90 degrees at least twice to subsequently also pass through one of the gas passage apertures in the second strainer element and with the gas passage apertures of the second strainer element offset relative to the module housing gas discharge openings and wherein gas passing through the gas passage apertures of the second strainer element must turn at approximately 90 degrees at least twice to subsequently also pass through one of the module housing gas discharge openings.

18. The inflator assembly of claim 17 wherein the inflator contains a quantity of gas generant solid effective upon reaction to produce gas and wherein the gas emitted from the inflator additionally comprises particulate matter resulting from the reacted gas generant solid.

19. The inflator assembly of claim 17 wherein the first and the second strainer elements are sufficiently spaced one from the other such that the spacing does not restrict exit gas flow.

20. The inflator assembly of claim 17 wherein the gas passage apertures of the second strainer element are sized to control combustion pressure within the inflator.

* * * * *